Patented July 27, 1937

2,088,353

UNITED STATES PATENT OFFICE 2,088,353

COMPLEX METAL COMPOUNDS OF AZO DYESTUFFS AND PROCESS FOR THEIR PRODUCTION

Guido von Rosenberg, Ludwigshafen-on-the-Rhine, Germany, assignor to General Aniline Works, Inc., New York, N. Y., a corporation of Delaware No Drawing. Original application December 18, 1934, Serial No. 758,139. Divided and this application March 18, 1936, Serial No. 69,532. In Germany December 23, 1933

10 Claims. (Cl. 260—12.1)

The present invention relates to a process of producing complex metal compounds of azo dyestuffs. This application has been divided out from my copending application Ser. No. 758,139, filed the 18th of December 1934.

I have found that valuable complex metal compounds of azo dyestuffs can be obtained in a very advantageous manner by causing azo dyestuffs produced by coupling one molecular proportion of tetrazotized 3,3'-dimethoxy-4,4'-diamino-diphenyl with two molecular proportions of a naphthol to react with heavy metal salts of organic high molecular carboxylic acids, the reaction being effected at elevated temperatures. In some cases only slightly elevated temperatures such as the boiling temperature of benzene or the friction heat developed by rolling the reaction components on rollers are sufficient while in other cases temperatures between 150° and 200° C. are necessary. Especially advantageous are such metal compounds as have in their molten phase a noticeable dissolving power for the dyestuffs to be treated at elevated temperatures. Metal compounds of the said kind are for example the stearates, oleates, linoleates, naphthenates, resinates of a heavy metal such as chromium, copper, iron, nickel, cobalt and lead. The reaction may be carried out by heating a mixture of the said azo dyestuff and a compound yielding metal either as such or after the addition of suitable compounds depressing the melting point, for example until the metal compound melts. Suitable additions depressing the melting point are for example free acids such as stearic acid. In many cases it may be advantageous, in order to produce favorable solution conditions, to add to the reaction mixture water-insoluble organic solvents in which both the compounds yielding metals and the dyestuffs are soluble, as for example hydrocarbons such as benzene, xylenes, any of the isomeric compounds or mixtures thereof and naphthalene, substituted hydrocarbons such as trichlorbenzenes for example commercial trichlorbenzene consisting mainly of 1,2,4-trichlorbenzene and nitro benzene, esters, ethers, ketones and printers' varnishes. Among the complex metal compounds, obtainable by the present invention, the complex copper compounds of the said azo dyestuffs are especially valuable. Thus for instance the dyestuff containing copper and described in the Examples 1 and 2 imparts to the materials to be dyed very pure blue shades, in contrast to the corresponding copper compounds obtained in the known manner, which only give violet to bluish violet shades.

In many cases it is not necessary to separate the resulting metal compounds from the reaction mixture; the reaction mixture itself may be used for coloring. For example if a metal stearate be employed for the preparation of a complex metal compound, the reaction mixture may be directly employed for example for coloring candles; by triturating the said azo dyestuff with a printing varnish and then reacting with a metal linoleate by heating a printing ink is obtained.

The following examples will further illustrate the nature of this invention but the invention is not restricted to these examples. The parts are by weight.

Example 1

A mixture of 5.6 parts of the azo dyestuff derived from 1 molecular proportion of tetrazotized 3,3'-dimethoxy-4,4'-diaminodiphenyl and 2 molecular proportions of beta-naphthol, 14 parts of copper stearate and 150 parts of a xylene for example the commercial mixture of isomeric xylene is heated to boiling for a short time.

After cooling the whole is filtered by suction and the residue is washed with acetone and dried. A crystalline product is obtained having a clear blue color and a bronze lustre; it may be employed for example as a pigment dyestuff for printing varnishes.

Example 2

1 part of the azo dyestuff derived from 1 molecular proportion of tetrazotized 3,3'-dimethoxy-4,4'-diaminodiphenyl and 2 molecular proportions of beta-naphthol is triturated with 3.5 parts of printing varnish with an addition of 2.2 parts of copper linoleate, the mixture then being heated at about 100° C. until a sample yields a pure blue shade of color when printed.

If the trituration be carried out on the rollers or in another suitable device in which a rise in temperature takes place, the reaction occurs at once and provided the operation be continued for a sufficiently long period a paste is obtained which can be employed as a blue color for printing.

If, instead of the azo dyestuff free from metal described in the first paragraph of this example, the violet copper compound prepared therefrom in the usual manner be employed, a blue copper compound is likewise obtained. The violet copper-containing dyestuff may also be subsequently treated with chromium linoleate.

Example 3

A mixture of 1 part of the azo dyestuff derived from 1 molecular proportion of tetrazotized 3,3′-dimethoxy-4,4′-diaminodiphenyl and 2 molecular proportions of beta-naphthol, 5 parts of chromium stearate and 40 parts of commercial trichlorbenzene is heated to boiling for half an hour whereby the color of the solution changes from violet to blue. After cooling, the whole is allowed to stand for some time; the deposited dyestuff is filtered off by suction, washed and dried. A dark powder is obtained which when triturated with printing varnish yields a greenish blue shade.

A greenish blue product is obtained from the azo dyestuff derived from 1 molecular proportion of tetrazotized 3,3′-dimethoxy-4,4′-diaminodiphenyl and 2 molecular proportions of 2,3-hydroxynaphthoic acid anilide by treatment with chromium stearate.

What I claim is:—

1. The process of producing complex metal compounds of dyestuffs which comprises heating in the absence of water an azo dyestuff produced by coupling one molecular proportion of tetrazotized 3,3′-dimethoxy-4,4′-diaminodiphenyl with two molecular proportions of a naphthol, with a heavy metal salt of an organic high-molecular carboxylic acid selected from the group consisting of naphthenic acids, resinic acids and aliphatic carboxylic acids as contained in natural fats, oils and waxes.

2. The process of producing complex metal compounds of dyestuffs which comprises heating in the absence of water the azo dyestuff produced by coupling one molecular proportion of tetrazotized 3,3′-dimethoxy-4,4′-diaminodiphenyl with two molecular proportions of beta-naphthol, with a heavy metal salt of an organic high-molecular carboxylic acid selected from the group consisting of naphthenic acids, resinic acids and aliphatic carboxylic acids as contained in natural fats, oils and waxes.

3. The process of producing complex metal compounds of dyestuffs which comprises heating in the absence of water the azo dyestuff produced by coupling one molecular proportion of tetrazotized 3,3′-dimethoxy-4,4′-diaminodiphenyl with two molecular proportions of 2,3-hydroxynaphthoic acid anilide, with a heavy metal salt of an organic high-molecular carboxylic acid selected from the group consisting of naphthenic acids, resinic acids and aliphatic carboxylic acids as contained in natural fats, oils and waxes.

4. The process of producing complex metal compounds of dyestuffs which comprises heating in the absence of water an azo dyestuff produced by coupling one molecular proportion of tetrazotized 3,3′-dimethoxy-4,4′-diaminodiphenyl with two molecular proportions of a naphthol, with a heavy metal salt of an organic high-molecular carboxylic acid selected from the group consisting of naphthenic acids, resinic acids and aliphatic carboxylic acids as contained in natural fats, oils and waxes in the presence of a compound depressing the melting point of the said salt.

5. The process of producing complex metal compounds of dyestuffs which comprises heating in the absence of water an azo dyestuff produced by coupling one molecular proportion of tetrazotized 3,3′-dimethoxy-4,4′-diaminodiphenyl with with two molecular proportions of a naphthol, with a heavy metal salt of an organic high-molecular carboxylic acid selected from the group consisting of naphthenic acids, resinic acids and aliphatic carboxylic acids as contained in natural fats, oils and waxes in the presence of a water-insoluble organic vehicle, in which the dyestuff to be treated and the said salt are soluble.

6. The process of producing complex metal compounds of dyestuffs which comprises triturating in the absence of water in a suitable mechanical device a mixture of an azo dyestuff produced by coupling one molecular proportion of tetrazotized 3,3′-dimethoxy-4,4′-diaminodiphenyl with two molecular proportions of a naphthol, with a heavy metal salt of an organic high-molecular carboxylic acid selected from the group consisting of naphthenic acids, resinic acids and aliphatic carboxylic acids as contained in natural fats, oils and waxes and an organic vehicle, in which the dyestuff to be treated and the said salt are soluble, the reaction temperature being developed by the friction heat of the moving parts of the mechanical device.

7. The process of producing complex metal compounds of dyestuffs which comprises heating in the absence of water an azo dyestuff produced by coupling one molecular proportion of tetrazotized 3,3′-dimethoxy-4,4′-diaminodiphenyl with with two molecular proportions of a naphthol, with a heavy metal salt of an organic high-molecular carboxylic acid selected from the group consisting of naphthenic acids, resinic acids and aliphatic carboxylic acids as contained in natural fats, oils and waxes in the presence of a water-insoluble organic solvent, in which the dyestuff to be treated and the said salt are soluble, at the boiling point of the said organic solvent.

8. As a new composition of matter, the reaction mixture comprising complex metal compounds of dyestuffs produced by heating in the absence of water an azo dyestuff obtained by coupling one molecular proportion of tetrazotized 3,3′-dimethoxyl-4,4′-diaminodiphenyl with two molecular proportions of a naphthol, with a heavy metal salt of an organic high-molecular carboxylic acid selected from the group consisting of naphthenic acids, resinic acids and aliphatic carboxylic acids as contained in natural fats, oils and waxes.

9. As a new composition of matter, the reaction mixture comprising complex metal compounds of dyestuffs produced by heating in the absence of water an azo dyestuff produced by coupling one molecular proportion of tetrazotized 3,3′-dimethoxy-4,4′-diaminodiphenyl with two molecular proportions of a naphthol, with a heavy metal salt of an organic high-molecular carboxylic acid selected from the group consisting of naphthenic acids, resinic acids and aliphatic carboxylic acids as contained in natural fats, oils and waxes in the presence of a water-insoluble organic solvent, in which the dyestuff to be treated and the said salt are soluble.

10. A complex copper compound giving pure blue shades to the dyed material, produced by heating in the absence of water the dyestuff, derived from one molecular proportion of tetrazotized 3,3′-dimethoxy-4,4′-diaminodiphenyl with two molecular proportions of beta-naphthol, with a copper salt of an organic high-molecular carboxylic acid selected from the group consisting of naphthenic acids, resinic acids and aliphatic carboxylic acids as contained in natural fats, oils and waxes.

GUIDO von ROSENBERG.